Nov. 19, 1968  B. W. OSTRANDER  3,412,288
ARC SUPPRESSION CIRCUIT FOR INDUCTIVE LOADS
Filed Jan. 25, 1965

INVENTOR.
BURL W. OSTRANDER
BY
C. R. Meland
HIS ATTORNEY

United States Patent Office 3,412,288
Patented Nov. 19, 1968

3,412,288
ARC SUPPRESSION CIRCUIT FOR
INDUCTIVE LOADS
Burl W. Ostrander, Brown Deer, Wis., assignor to General Motors Corporation, Detroit, Mich., a corporation of Delaware
Filed Jan. 25, 1965, Ser. No. 427,881
4 Claims. (Cl. 317—11)

This invention relates to an electric circuit for reducing the arcing at the switch contacts of an electrical system that has an inductive load controlled by the switch.

It is well known that when an inductive load is supplied from a source of power through switch contacts, there is an arc produced at the contacts when the circuit is broken by opening the switch. The present invention is concerned with reducing the arcing at the switch contacts when the switch contacts are opened.

It is accordingly one of the objects of this invention to provide a means for reducing arcing at the switch contacts of an electrical system where a switch controls the supply of energy to an inductive load.

It is known in the art of arc suppression to magnetically couple a winding to the inductive load such that the winding has a voltage induced in it when the switch contacts controlling the inductive load are opened. This type of arrangement is disclosed in the United States patents to Walker, 2,637,769, and to De Tastes, 2,669,687. The present invention differs from the teachings of these two patents in that the winding which is inductively coupled with the inductive load is short circuited so that the winding in effect operates as a short circuited secondary winding of a transformer where the inductive load is the primary winding.

It accordingly is another object of this invention to provide an arc suppression circuit for an inductive load where a winding is magnetically coupled to the inductive load and is short circuited so as to provide in effect a transformer having a short circuited secondary.

Another object of this invention is to provide an arc suppressing circuit for dynamoelectric machines where the field winding of the dynamoelectric machine is inductively coupled with a winding which acts as a short circuited secondary to reduce arcing in the switching circuit controlling the field.

Further objects and advantages of the present invention will be apparent from the following description, reference being had to the accompanying drawings wherein preferred embodiments of the present invention are clearly shown.

Figure 1:
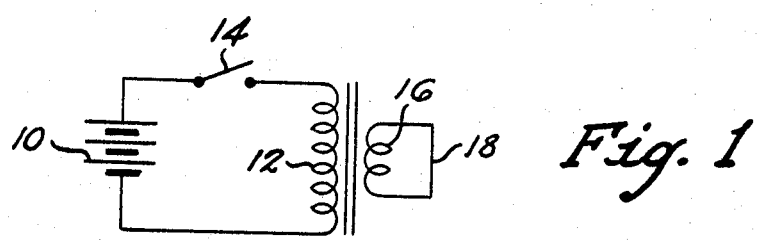
FIGURE 1 is a schematic circuit diagram of an arc suppression system made in accordance with this invention.

Referring now to the drawings and more particularly to FIGURE 1, the reference numeral 10 designates a source of direct current which is shown as a battery. It will be appreciated that the source 10 could take other forms and if desired could be a generator. The source 10 supplies an inductive electrical load 12 through a switch 14. The inductive load 12 could take a wide variety of forms and could be, for example, a relay coil. The inductive load 12 is supplied with direct current whenever the switch 14 is closed and when this switch is opened, the circuit to the inductive load is broken and an arc will jump across the switch contacts.

In order to reduce the arc developed upon opening the switch, the inductive load 12 is magnetically coupled to a winding 16. The winding 16 is shorted by a conductor 18 and the winding 16 therefore in effect forms a shorted secondary of a transformer where the inductive load 12 is the primary of the transformer. It has been found with this arrangement that the arc that jumps the contacts of switch 14 when the switch is opened is greatly reduced by the use of the shorted winding 16. Thus, the energy stored due to the mutual inductance of the windings is dissipated as current through the short circuited secondary winding 16. This greatly reduces the arc that appears at the contacts 14 and the only arc that remains will be due to energy stored in the leakage inductance. This energy is very small compared to that stored by virtue of mutual inductance so that the arc is accordingly greatly reduced. It is desirable to wind the windings 12 and 16 on the same core and in such a manner as to minimize leakage inductance.

The secondary winding 16 can take various forms and might, for example, be a metal ring or cylinder which is magnetically coupled to the inductive load 12.

Figure 2:
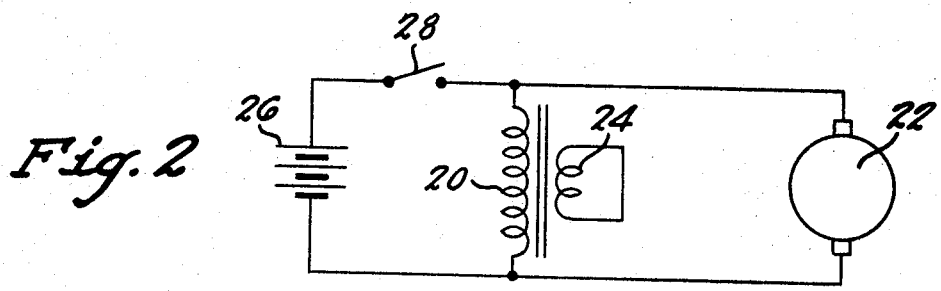
FIGURE 2 is a schematic circuit diagram of a shorted secondary arc suppression system as applied to a direct current shunt wound motor or generator.

Referring now to FIGURE 2, the arc suppression system of this invention is shown applied to the field winding 20 of a direct current motor which has an armature winding 22. A short circuited winding 24 is magnetically coupled to the field winding 20 and the field and armature windings are supplied from a source of direct current 26 through a switch 28. The short circuited winding 24 could be applied to the field winding of a direct current generator as well as to the field winding of a direct current motor. The short circuited secondary winding 24 will reduce arcing at the switch contacts 28 when the contacts are opened.

Figure 3:
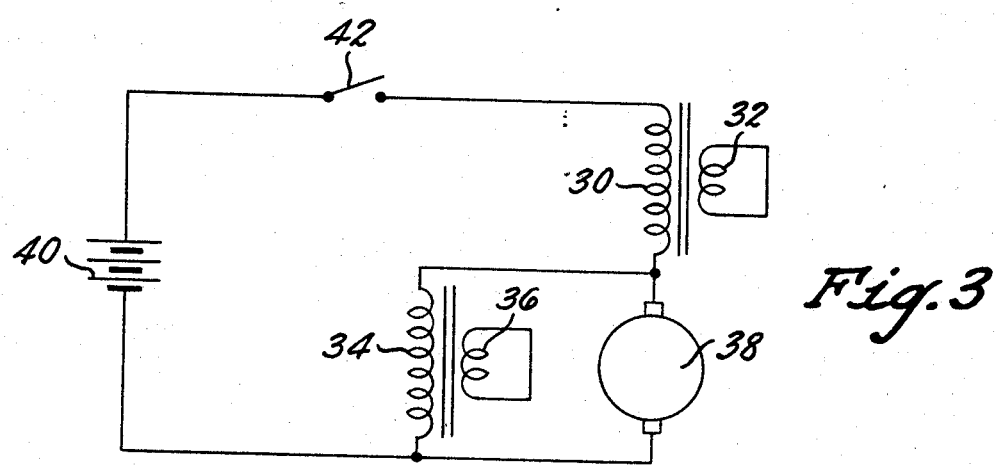
FIGURE 3 is a schematic circuit diagram of an arc suppression system applied to a direct current motor or generator that is compound wound.

In FIGURE 3, the arc suppressing arrangement of this invention is shown applied to a compound wound direct current motor. In this case, the series field 30 is magnetically coupled with a short circuited secondary winding 32. The shunt field 34 of the generator is magnetically coupled with a shorted secondary winding 36. The armature winding for the generator is designated by reference numeral 38. It will be appreciated that the windings 32 and 36 could also be used with the series and shunt field windings of a direct current generator.

The dynamoelectric machine in FIGURE 3 is fed from a source of direct current 40 through a switch 42 and the windings 32 and 36 reduce arcing at the switch contacts 42 when these contacts are opened.

It is important to the success of this invention that the auxiliary winding which forms the secondary be shorted rather than supplying an electrical load such as in the above-mentioned Walker patent, 2,637,769. The advantage of shorting the auxiliary winding so that it forms a short circuited secondary resides in the fact that the device will respond faster to suppressing arcing as compared to the situation such as in Walker, 2,637,769, where the auxiliary winding feeds an electrical load. In addition, by using a shorted arc suppressing winding, the winding can take the form of a metal ring or cylinder magnetically coupled to the inductive load thus making a compact construction and one that is reliable.

It is also important in practicing this invention that the auxiliary winding which is shorted be not connected into the active circuit that is supplying the inductive load.

It will be appreciated that by using a shorted arc suppressing auxiliary winding, the total resistance of the shorted secondary is primarily the electrical resistance of the secondary winding itself where a coil winding is used. Where a metal cylinder or metal ring is used as a secondary winding, the total resistance will be negligible.

While the embodiments of the present invention as herein disclosed constitute a preferred form, it is to be understood that other forms might be adopted.

What is claimed is as follows:

1. An electrical system comprising a source of direct current, a dynamoelectric machine having a field winding, means electrically connecting said source of direct current and said dynamoelectric machine including a control switch, and means for reducing the arcing at said control switch when said control switch is opened, said means comprising a winding means inductively coupled with said field winding, said winding means being permanently short circuited and being permanently disconnected from said source of direct current.

2. An electrical system comprising, a source of direct current, a compound wound dynamoelectric machine having a series field winding and a shunt field winding, means connecting said windings with said source of direct current including a control switch, and means for reducing the arcing at said control switch when said control switch is opened, said last named means comprising windings respectively magnetically coupled with said series field winding and said shunt field winding, said windings being permanently short circuited and permanently disconnected from said source of direct current.

3. An electrical system comprising, a source of direct current, a control switch, an inductive electrical load, means connecting said source of direct current, said control switch and said inductive load in a series circuit whereby said source of direct current supplies current to said electrical load when said control switch is closed, and a winding magnetically coupled to said inductive load for reducing arcing at the contacts of said control switch when said control switch is opened, said winding being permanently disconnected from said electrical load and being permanently short circuited.

4. An electrical system comprising, a source of direct current, a dynamoelectric machine having a first winding, a control switch, a circuit connecting said source of direct current, said control switch and said first winding of said dynamoelectric machine in series, and a second winding inductively coupled to said first winding of said dynamoelectric machine for reducing arcing at the contacts of said control switch when said control switch is opened to disconnect said source of direct current and said dynamoelectric machine, said second winding being permanently short circuited and permanently disconnected from said first winding of said dynamoelectric machine.

References Cited

UNITED STATES PATENTS

| | | | |
|---|---|---|---|
| 816,464 | 3/1906 | Hewlett | 317—11 |
| 3,152,282 | 10/1964 | Baltensperger et al. | 317—11 |

LEE T. HIX, *Primary Examiner.*

R. V. LUPO, *Assistant Examiner.*